(12) United States Patent
Hung et al.

(10) Patent No.: US 9,739,414 B2
(45) Date of Patent: Aug. 22, 2017

(54) MULTI-AXIS CARRYING DEVICE

(71) Applicant: Metal Industries Research and Development Centre, Kaohsiung (TW)

(72) Inventors: Kuo-Kai Hung, Kaohsiung (TW); Chia-Chu Huang, Kaohsiung (TW); Hui-Hung Lin, Kaohsiung (TW)

(73) Assignee: Metal Industries Research and Development Centre, Kaohsiung (TW)

( * ) Notice: Subject to any disclaimer, the term of this patent is extended or adjusted under 35 U.S.C. 154(b) by 270 days.

(21) Appl. No.: 14/796,641

(22) Filed: Jul. 10, 2015

(65) Prior Publication Data

US 2016/0169441 A1    Jun. 16, 2016

(30) Foreign Application Priority Data

Dec. 10, 2014    (TW) .............................. 103143029 A

(51) Int. Cl.
| | |
|---|---|
| *B23Q 3/00* | (2006.01) |
| *F16M 11/04* | (2006.01) |
| *F16M 11/12* | (2006.01) |
| *F16M 11/18* | (2006.01) |

(52) U.S. Cl.
CPC .......... *F16M 11/043* (2013.01); *F16M 11/121* (2013.01); *F16M 11/18* (2013.01)

(58) Field of Classification Search
CPC . B23Q 3/00; B23Q 3/005; B23Q 3/06; B23Q 3/084; B23Q 1/00
See application file for complete search history.

(56) References Cited

U.S. PATENT DOCUMENTS

| | | | |
|---|---|---|---|
| 4,896,869 A * | 1/1990 | Takekoshi | B23P 19/04 269/309 |
| 7,637,487 B2 * | 12/2009 | Muto | B23Q 1/621 269/289 R |
| 7,959,141 B2 * | 6/2011 | Makino | G03B 27/62 269/58 |
| 2016/0169441 A1* | 6/2016 | Hung | F16M 11/043 248/396 |

* cited by examiner

*Primary Examiner* — Lee D Wilson
(74) *Attorney, Agent, or Firm* — LeClairRyan

(57) ABSTRACT

A multi-axis carrying device includes a base, first and second main moving units mounted to the base, a first platform connected to the first and second main moving units, and first and second driving units. The first driving unit has a first output structure coupled to the first main moving unit. The second driving unit has a second output structure coupled to the second main moving unit. When the first and second output structures move in a moving direction, the first and second main moving units are driven to move two opposite sides of the first platform in another direction perpendicular to the moving direction.

12 Claims, 15 Drawing Sheets

MULTI-AXIS CARRYING DEVICE

CROSS-REFERENCE TO RELATED APPLICATION

This application claims priority of Taiwanese Application No. 103143029, filed on Dec. 10, 2014.

FIELD

The disclosure relates to a carrying device, and more particularly to a multi-axis carrying device.

BACKGROUND

Referring to FIG. 1, Taiwanese Utility Model Patent No. M319503 discloses a conventional multi-axis carrying device that includes abase 11, two first moving units 12, two second moving units 13, and a platform 14 connected to the first moving units 12 and the second moving units 13. The first moving units 12 are mounted diagonally on the base 11, and each includes a driving unit 121 mounted on the base 11, a first horizontally movable component 122 that is driven by the driving unit 121 to move in an x-direction, an elastic second horizontally movable component 123 connected to the first horizontally movable component 122, and a rotating unit 124 connected between the second horizontally movable component 123 and the platform 14. The second moving units 13 are mounted diagonally on the base 11, and each includes a driving unit 131 mounted on the base 11, a first horizontally movable component 132 that is driven by the driving unit 131 to move in a y-direction perpendicular to the x direction, an elastic second horizontally movable component 133 connected to the first horizontally movable component 132, and a rotating unit 134 connected between the second horizontally movable component 133 and the platform 14.

Through appropriate operations of the driving units 121, 123, the platform 14 is able to be moved in the x-direction, the y-direction, or to be rotated about a rotating axis (R) that extends in a z-direction perpendicular to the x direction and the y-direction.

However, due to the configuration of the conventional multi-axis carrying device, the platform 14 can only be moved in the directions in which the first horizontally movable components 122, 132 move (i.e., the x-direction and the y-direction), and cannot be moved in a z-direction that is perpendicular to the x-direction and the y-direction. Moreover, the platform 14 cannot be rotated about an axis that resides in the X-Y plane.

SUMMARY

Therefore, an object of the disclosure is to provide a multi-axis carrying device that can overcome at least one of the aforesaid drawbacks associated with the prior art.

According to the disclosure, the multi-axis carrying device includes a base, at least one first main moving unit, at least one second main moving unit, a first platform, a pair of first auxiliary moving units, a first driving unit and a second driving unit. The first main moving unit is mounted on the base. The second main moving unit is mounted on the base and spaced apart from the first main moving unit. The first platform is coupled to the first and second main moving units. The first auxiliary moving units are mounted on the base and are respectively coupled to two opposite sides of the first platform along a first rotating axis that extends in a y-direction such that the first platform is rotatable about the first rotating axis. The first driving unit is mounted on the base, and has a first output structure movable in an x-direction that is perpendicular to the y-direction and coupled to the first main moving unit for driving movement of a portion of the first main moving unit on the base. The second driving unit is mounted on the base, and has a second output structure movable in the x-direction and coupled to the second main moving unit for driving movement of a portion of the second main moving unit on the base. When the first output structure of the first driving unit and the second output structure of the second driving unit respectively move in opposite directions for the same distance, the first and second main moving units are driven to move the first platform in a z-direction that is perpendicular to the x-direction and the y-direction. When the first output structure of the first driving unit and the second output structure of the second driving unit move codirectionally for the same distance, the first and second main moving units are driven to rotate the first platform about the first rotating axis. When the first output structure of the first driving unit and the second output structure of the second driving unit move respectively for different distances, the first and second main moving units are driven to move the first platform in the z-direction and rotate the first platform about the first rotating axis.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
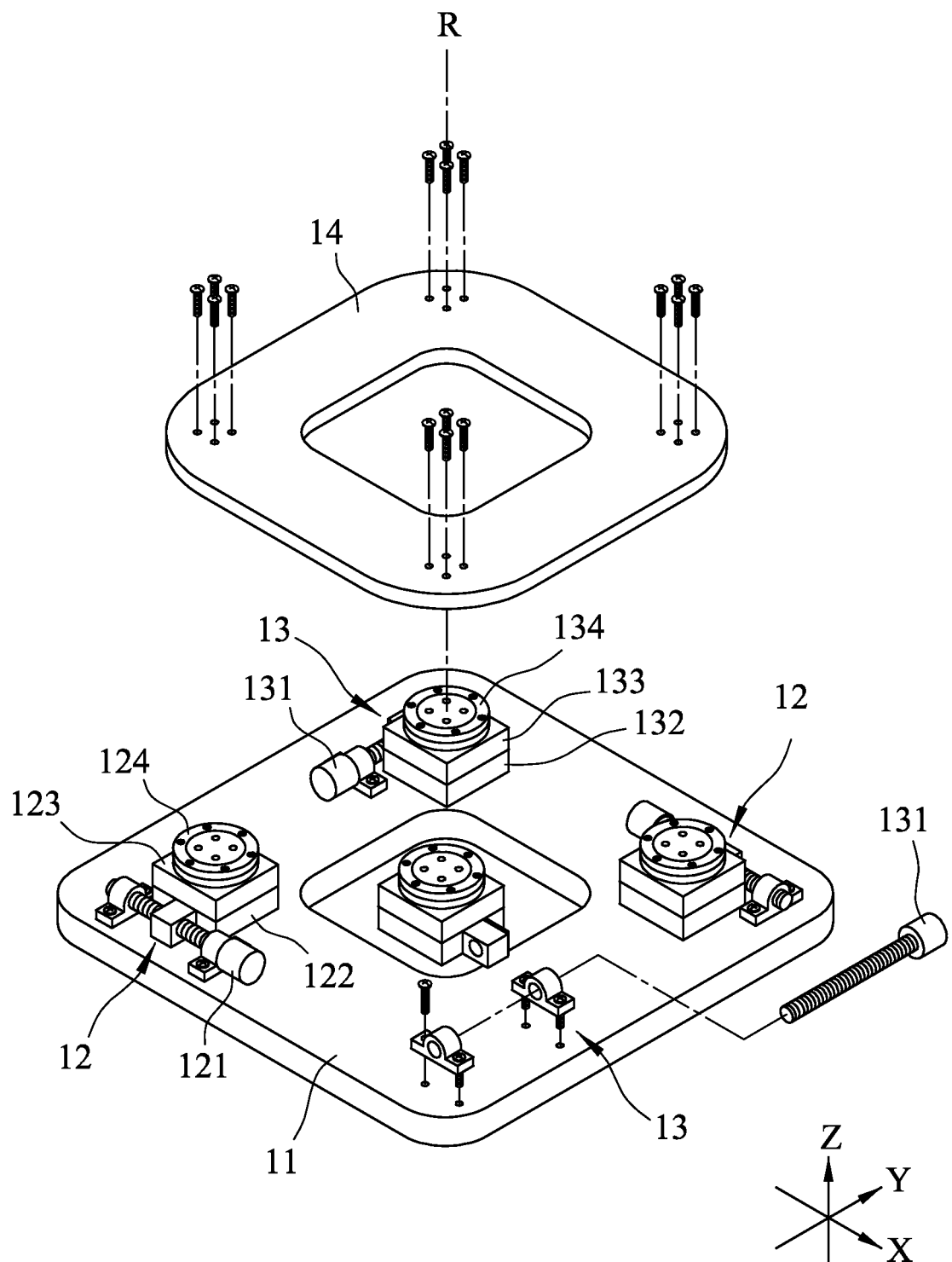
FIG. 1 is a partly exploded perspective view of a conventional multi-axis carrying device of Taiwanese Utility Model Patent No. M319503.

Before the disclosure is described in greater detail, it should be noted that like elements are denoted by the same reference numerals throughout the disclosure.

Figure 2:
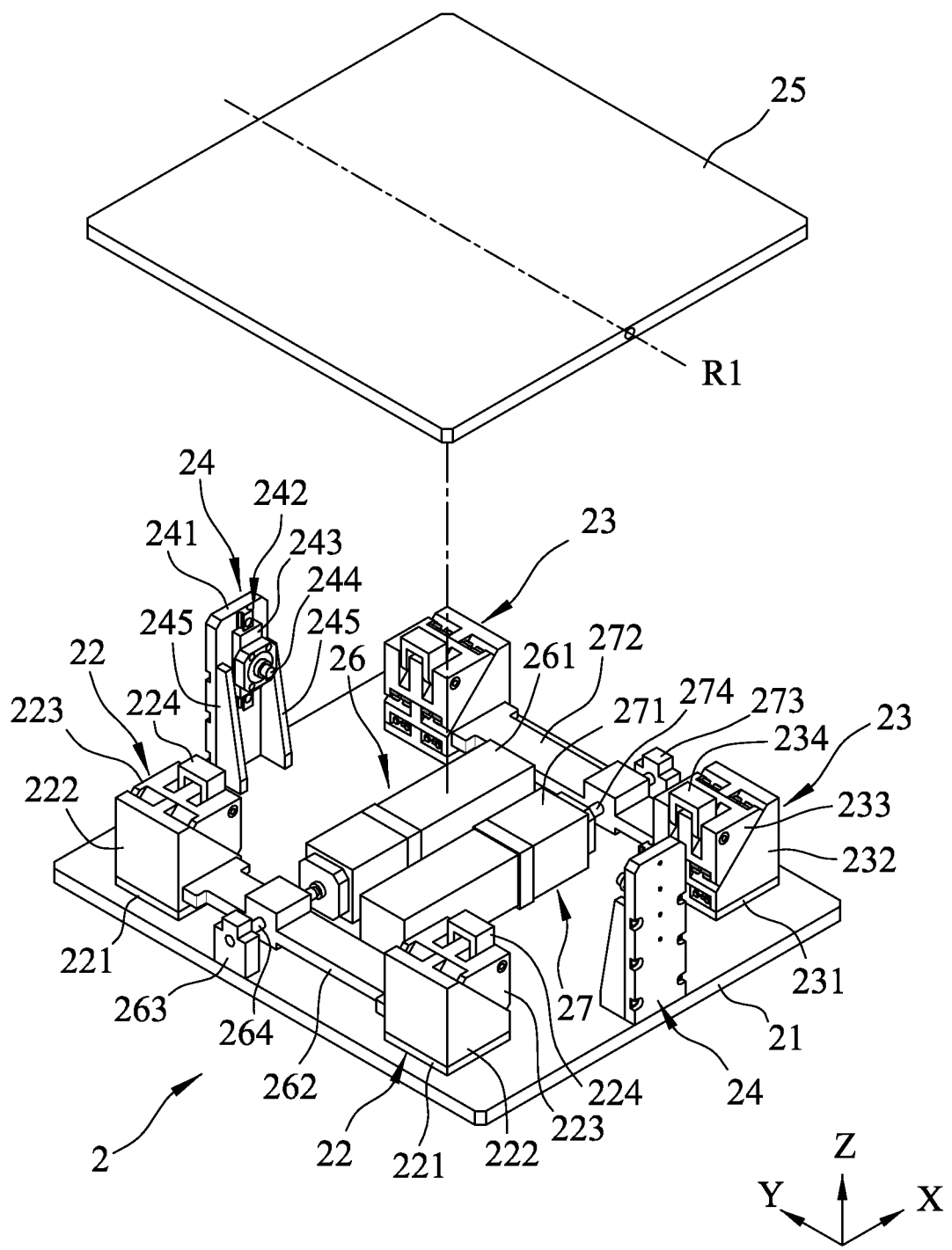
FIG. 2 is a partly exploded perspective view of a first embodiment of a multi-axis carrying device according to the disclosure.
Figure 3:
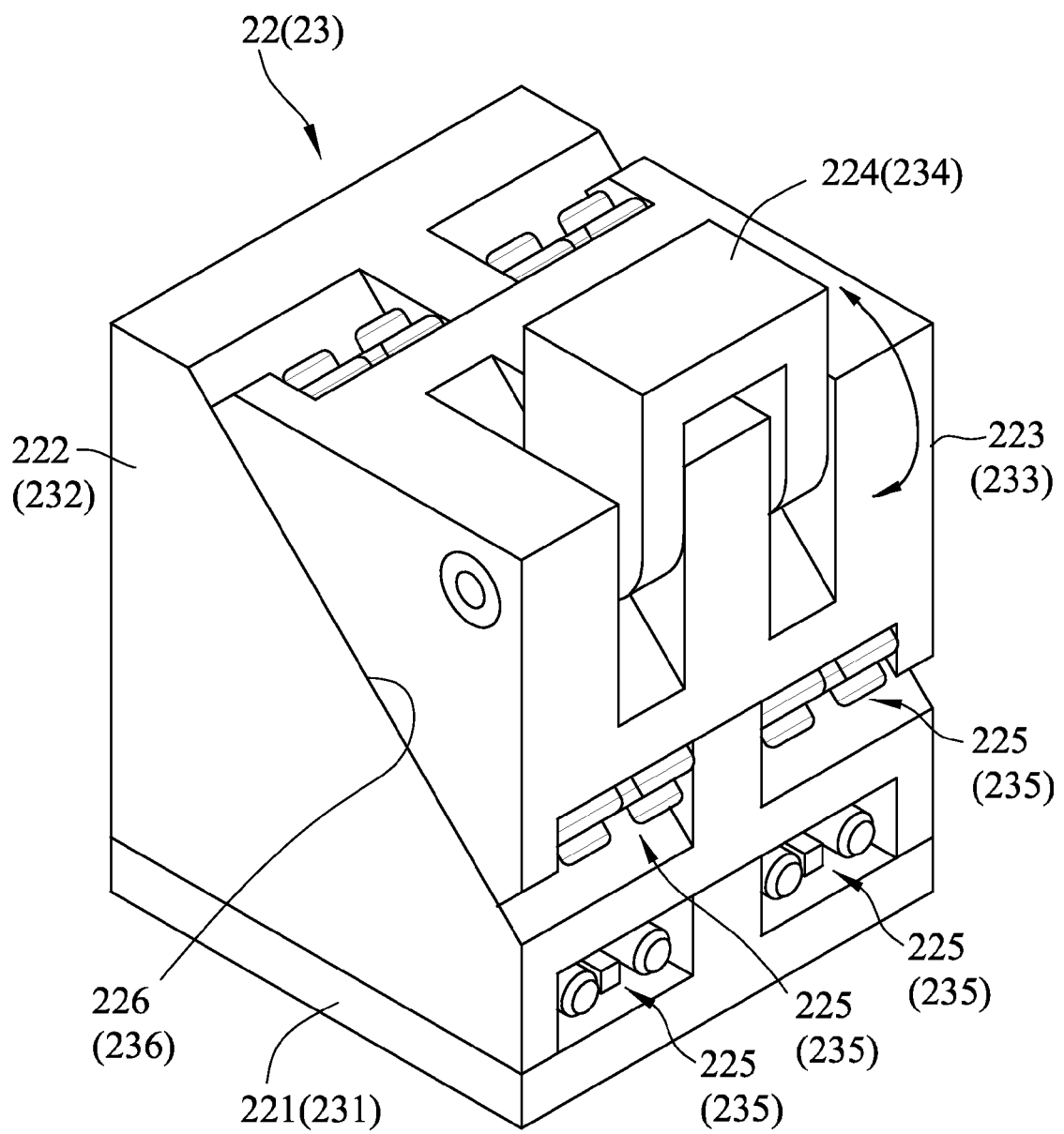
FIG. 3 is a perspective view of a first (second) main moving unit of the first embodiment.
Figure 4:
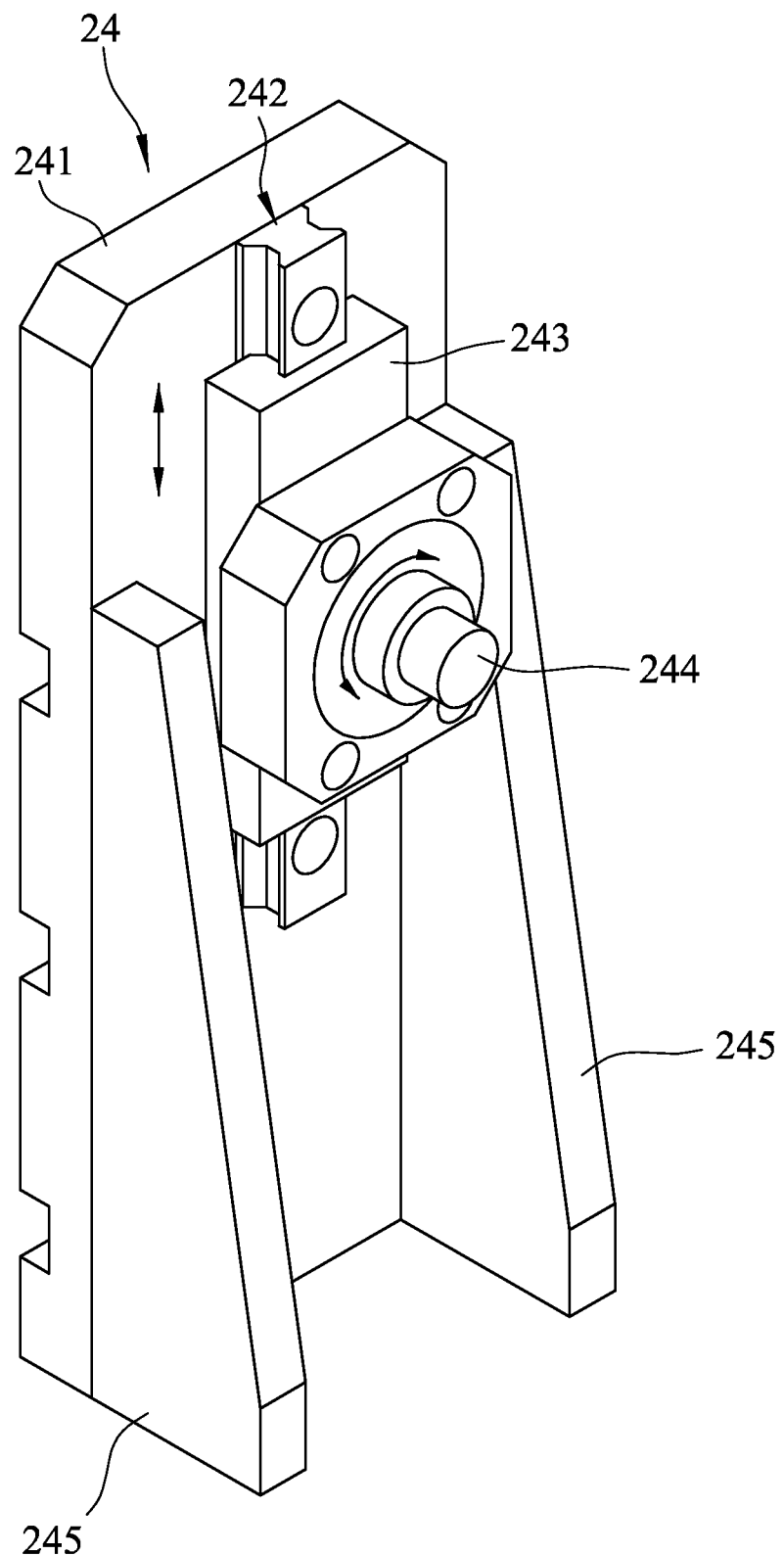
FIG. 4 is a perspective view of a first auxiliary moving unit of the first embodiment.

Referring to FIGS. 2 to 4, a first embodiment of a multi-axis carrying device according to the disclosure includes a first platform module 2. The first platform module 2 includes a base 21, a pair of first main moving units 22, a pair of second main moving units 23, a pair of first auxiliary moving units 24, a first platform 25, a first driving unit 26 and a second driving unit 27.

The first main moving units 22 are mounted on the base 21, and are spaced apart from each other in a y-direction (Y). Each of the first main moving units 22 includes a first bottom plate 221 that is fixed to the base 21, a first horizontally movable block 222 that is movable relative to the first bottom plate 221 in an x-direction (X) perpendicular to the y-direction (Y), that is in the shape of a trapezoid, and that has an inclined first cam surface 226, a first follower block 223 that is movable relative to the first horizontally movable block 222 along the first cam surface 226, and a first pivoting block 224 that is pivoted to the first follower block 223. Each of the first main moving units 22 further includes a plurality of first linear guiding components 225 that are connected between the first bottom plate 221 and the first horizontally movable block 222 of a corresponding one of the first main moving units 22 for guiding the movement of the first horizontally movable block 222 relative to the first bottom plate 221, and between the first horizontally movable block 222 and the first follower block 223 of the corresponding one of the first main moving units 22 for guiding the movement of the first follower block 223 relative to the first horizontally movable block 222.

The second main moving units 23 are mounted on the base 21, and are spaced apart from each other in the y-direction (Y). Each of the second main moving units 23 includes a second bottom plate 231 that is fixed to the base 21, a second horizontally movable block 232 that is movable relative to the second bottom plate 231 in the x-direction (X), that is in the shape of a trapezoid, and that has an inclined second cam surface 236, a second follower block 233 that is movable relative to the second horizontally movable block 232 along the second cam surface 236, and a second pivoting block 234 that is pivoted to the second follower block 233. Each of the second main moving units 23 further includes a plurality of second linear guiding components 235 that are connected between the second bottom plate 231 and the second horizontally movable block 232 of a corresponding one of the second main moving units 23 for guiding the movement of the second horizontally movable block 232 relative to the second bottom plate 231, and between the second horizontally movable block 232 and the second follower block 233 of the corresponding one of the second main moving units 23 for guiding the movement of the second follower block 233 relative to the second horizontally movable block 232.

The first platform 25 is coupled to the first and second main moving units 22, 23. In this embodiment, the first pivoting block 224 of each of the first main moving units 22 and the second pivoting block 234 of each of the second main moving units 23 are connected fixedly to a bottom surface of the first platform 25.

The first auxiliary moving units 24 are mounted on the base 21, and are spaced apart from each other in the y-direction (Y). The first main moving units 22 are located at one side of the first auxiliary moving units 24 opposite to the second main moving units 23. Each of the first auxiliary moving units 24 includes a first upright stand 241 that is fixed to the base 21, a first guide rail 242 that is disposed on the first upright stand 241 and that extends in a z-direction (Z) perpendicular to the x-direction (X) and the y-direction (Y), a first sliding block 243 that engages the first guide rail 242 and that is movable along the first guide rail 242, a first rotating shaft 244 that is mounted rotatably to the first sliding block 243, and a pair of reinforcing plates 245 that are respectively and perpendicularly connected to two opposite sides of the first upright stand 241 for supporting the first upright stand 241. The first rotating shafts 244 of the first auxiliary moving units 24 are respectively coupled to two opposite sides of the first platform 25 along a first rotating axis (R1) that extends in the y-direction (Y), so that the first platform 25 is rotatable about the first rotating axis (R1) and movable in the z-direction (Z).

The first driving unit 26 includes a first driving source 261, a first connecting plate 262, a first positioning seat 263 and a first output shaft 264. The first positioning seat 263 is mounted fixedly on the base 21. The first connecting plate 262 is connected co-movably to the first horizontally movable blocks 222 of the first main moving units 22. The first output shaft 264 is movable relative to the base 21 in the x-direction (X), is connected co-movably to a middle portion of the first connecting plate 262, and extends movably into the first positioning seat 263. The first driving source 261 is mounted on the base 21 for driving movements of the first output shaft 264, the first connecting plate 262 and the first horizontally movable blocks 222 in the x-direction (X) relative to the base 21. The first output shaft 264 and the first connecting plate 262 cooperatively serve as a first output structure of the first driving unit 26.

The second driving unit 27 includes a second driving source 271, a second connecting plate 272, a second positioning seat 273 and a second output shaft 274. The second positioning seat 273 is mounted fixedly on the base 21. The second connecting plate 272 is connected co-movably to the second horizontally movable blocks 232 of the second main moving units 23. The second output shaft 274 is movable relative to the base 21 in the x-direction (X), is connected co-movably to a middle portion of the second connecting plate 272, and extends movably into the second positioning seat 273. The second driving source 271 is mounted on the base 21 for driving movements of the second output shaft 274, the second connecting plate 272 and the second horizontally movable blocks 232 in the x-direction (X) relative to the base 21. The second output shaft 274 and the second connecting plate 272 cooperatively serve as a second output structure of the second driving unit 27. Each of the first and second follower blocks 223, 233 moves along a corresponding one of the first and second cam surfaces 226, 236 for driving the rotational and linear movements of the first platform 25 relative to the base 21 upon the movement of the first output structure of the first driving unit 26 and the movement of the second output structure of the second driving unit 27.

It is noted that the first connecting plate 262 may be connected co-movably to only one of the first horizontally movable blocks 222 of the first main moving units 22, and the second connecting plate 272 may be connected co-movably to only one of the second horizontally movable blocks 232 of the second main moving units 23 for driving movements of the first platform 25. With the abovementioned configuration, the other one of the first horizontally movable blocks 222 of the first main moving units 22 and the other one of the second horizontally movable blocks 232 of the second main moving units 23 are driven movably in response to the movements of the first platform 25.

Figure 5:
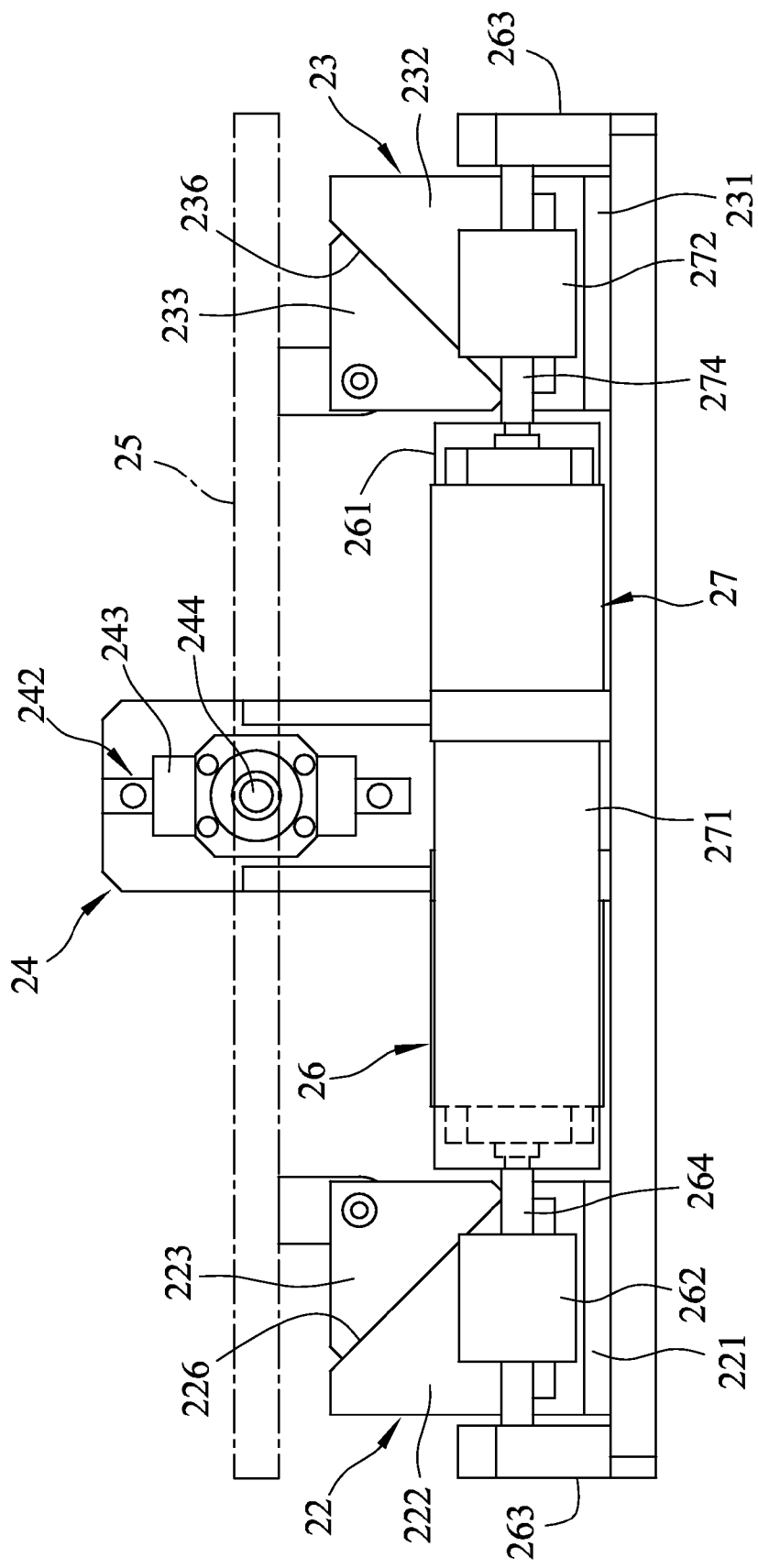
FIG. 5 is a schematic side view of the first embodiment illustrating the first embodiment in an initial state.

Referring to FIG. 5, the first embodiment of this disclosure is in an initial state, where the first platform 25 is kept at a horizontal position.

Figure 6:
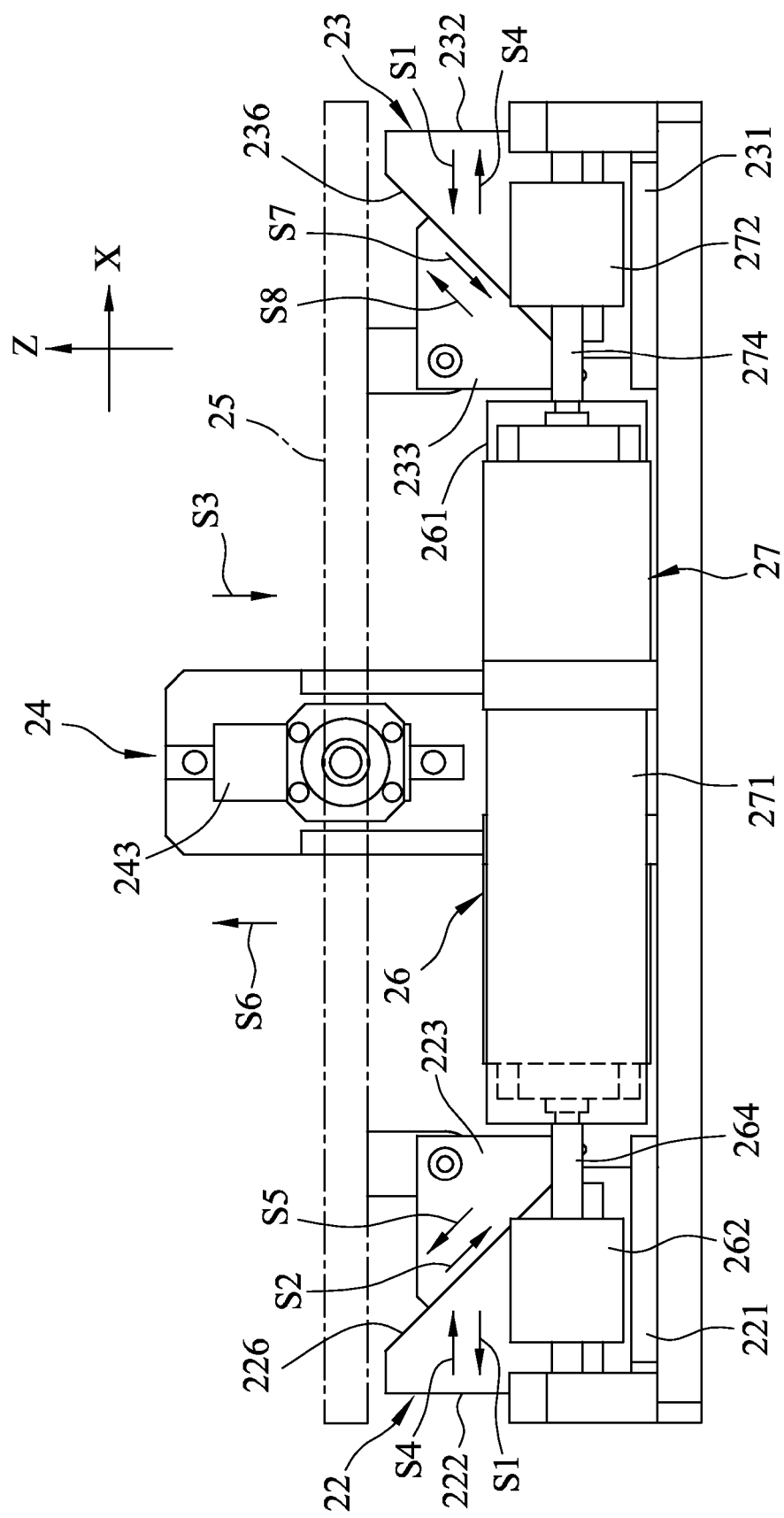
FIG. 6 is another schematic side view of the first embodiment, illustrating a first platform being moved in a z-direction.

Referring further to FIG. 6, when the first driving source 261 drives the first output structure of the first driving unit 26 to move in an S1-direction (S1, negative x-direction) for a distance and the second driving source 271 drives the second output structure of the second driving unit 27 to move in an S4-direction (S4, positive x-direction) for a distance the same as that of the first output structure, the first horizontally movable blocks 222 and the second horizontally movable blocks 232 are moved in opposite directions (i.e., S1-direction and S4-direction) for the same distance. Since the first linear guiding components 225 limit the linear relative movement between the first follower block 223 and the first horizontally movable block 222 of each of the first main moving units 22, the second linear guiding components 235 limit the relative linear movement between the second follower block 233 and the second horizontally movable block 232 of each of the second main moving units 23, and the first auxiliary moving units 24 limit the linear and rotatable movement of the first platform 25 relative to the base 21, the first follower block 223 of each of the first main moving units 22 is moved in an S2-direction (S2) relative to the first horizontally movable block 222 of a corresponding one of the first main moving units 22 and the second follower block 233 of each of the second main moving units 23 is moved in an S7-direction (S7) relative to the second horizontally movable block 232 of a corresponding one of the second main moving units 23, so as to move the first platform 25 and the first sliding block 243 and the first rotating shaft 244 of each of the first auxiliary moving units 24 in an S3-direction (S3, negative z-direction).

On the contrary, when the first driving source 261 drives the first output structure of the first driving unit 26 to move in the S4-direction (S4) for a distance and the second driving source 271 drives the second output structure of the second driving unit 27 to move in the S1-direction (S1) for a distance the same as that of the first output structure, the first follower block 223 of each of the first main moving units 22 is moved in an S5-direction (S5) relative to the first horizontally movable block 222 of the corresponding one of the first main moving units 22 and the second follower block 233 of each of the second main moving units 23 is moved in an S8-direction (S8) relative to the second horizontally movable block 232 of the corresponding one of the second main moving units 23, so as to move the first platform 25 and the first sliding block 243 and the first rotating shaft 244 of each of the first auxiliary moving units 24 in an S6-direction (S6, positive z-direction).

Figure 7:
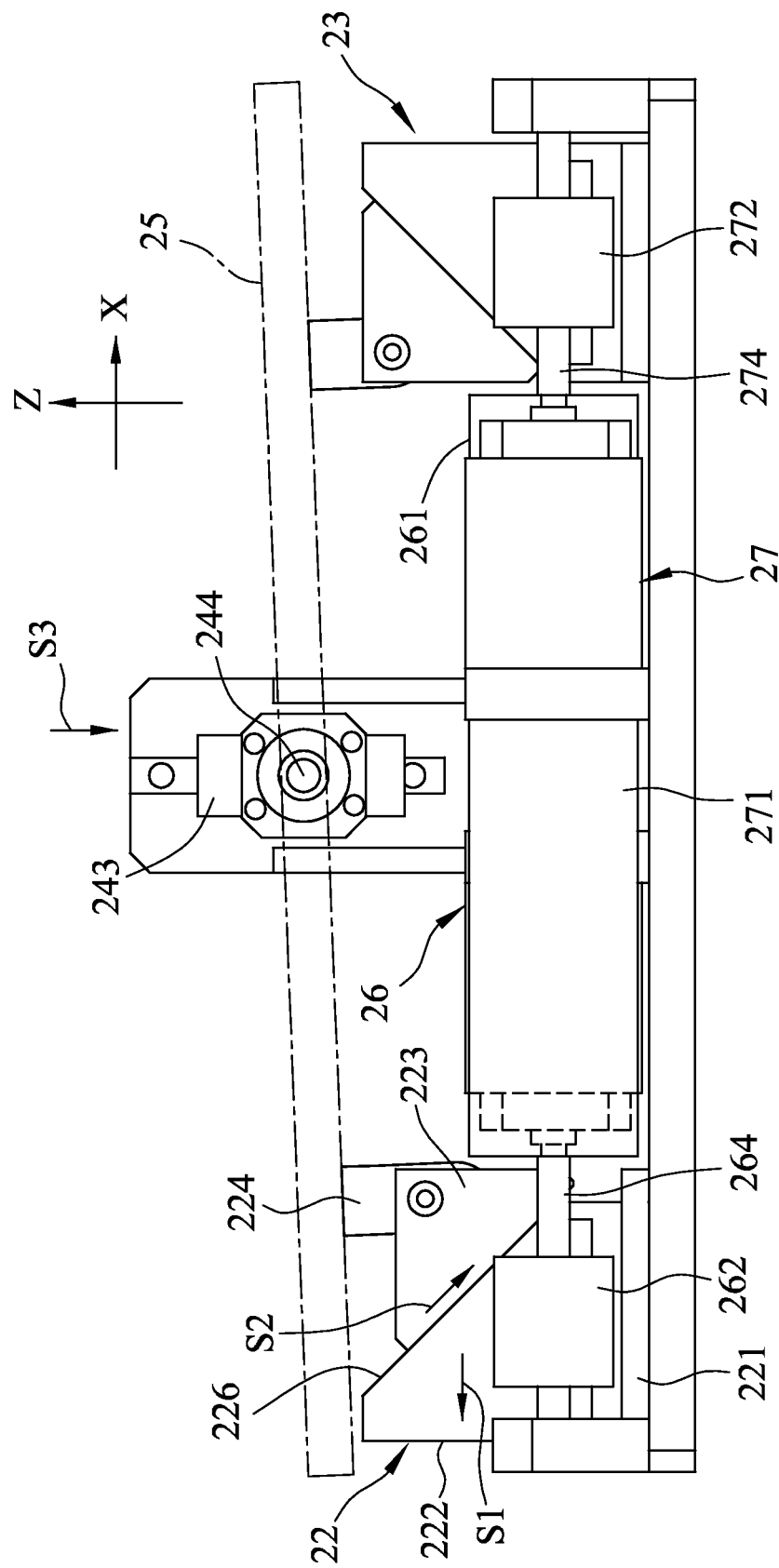
FIG. 7 is still another schematic side view of the first embodiment, illustrating the first platform being moved in the z-direction and rotated about a first rotating axis.

Referring further to FIG. 7, when the first driving source 261 drives the first output structure of the first driving unit 26 to move in the S1-direction (S1) and the second driving source 271 does not drive movement of the second output structure of the second driving unit 27, the first horizontally movable blocks 222 are moved in the S1-direction (S1). By virtue of the configurations of the first linear guiding components 225, the second linear guiding components 235 and the first auxiliary moving units 24, the first follower block 223 of each of the first main moving units 22 is moved in the S2-direction (S2) relative to the first horizontally movable block 222 of the corresponding one of the first main moving units 22, so as to rotate the first platform 25 about the first rotating axis (R1, see FIG. 2), and to move the first platform 25 and the first sliding block 243 and the first rotating shaft 244 of each of the first auxiliary moving units 24 in the S3-direction (S3).

Figure 8:
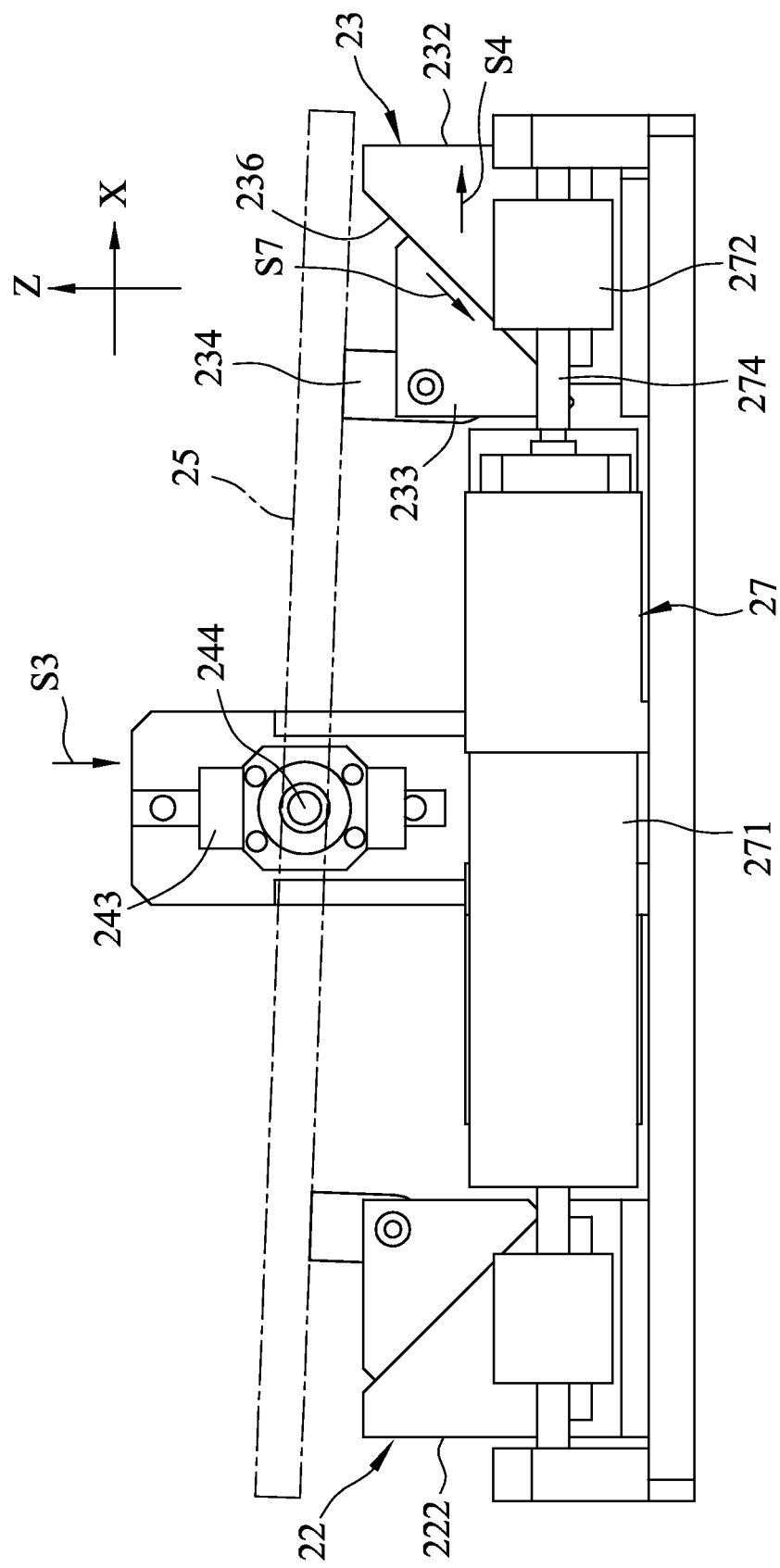
FIG. 8 is still another schematic side view of the first embodiment, illustrating the first platform being moved in the z-direction and rotated about the first rotating axis.

Referring further to FIG. 8, when the first driving source 261 does not drive movement of the first output structure of the first driving unit 26 and the second driving source 271 drives the second output structure of the second driving unit 27 to move in the S4-direction (S4), the second horizontally movable blocks 232 are moved in the S4-direction (S4). By virtue of the configurations of the first linear guiding components 225, the second linear guiding components 235 and the first auxiliary moving units 24, the second follower block 233 of each of the second main moving units 23 is moved in the S7-direction (S7) relative to the second horizontally movable block 232 of the corresponding one of the second main moving units 23, so as to rotate the first platform 25 about the first rotating axis (R1, see FIG. 2), and to move the first platform 25 and the first sliding block 243 and the first rotating shaft 244 of each of the first auxiliary moving units 24 in the S3-direction (S3).

Figure 9:
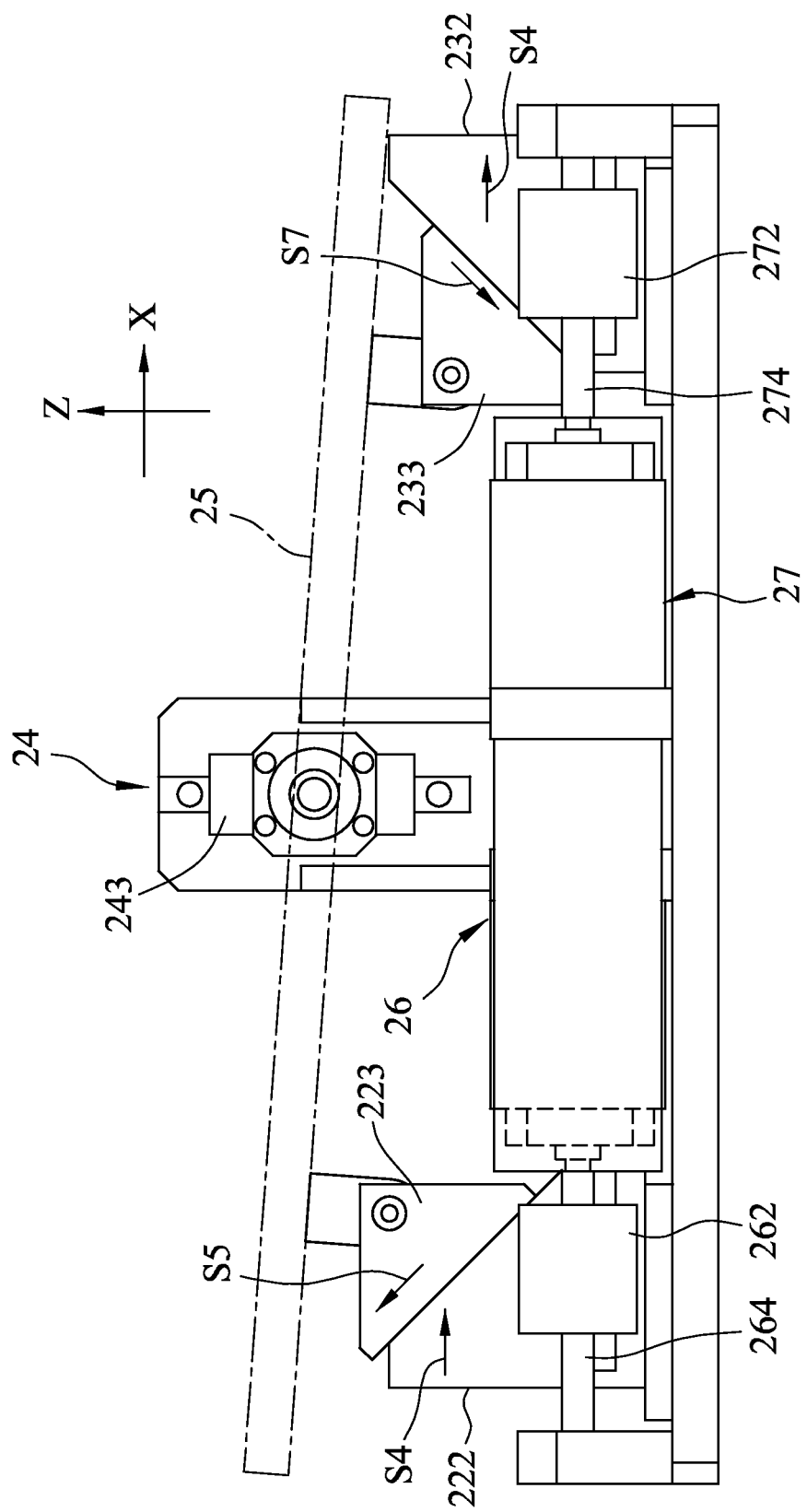
FIG. 9 is still another schematic side view of the first embodiment, illustrating the first platform being rotated about the first rotating axis.

Referring further to FIG. 9, when the first driving source 261 drives the first output structure of the first driving unit 26 to move in the S4-direction (S4) for a distance and the second driving source 271 drives the second output structure of the second driving unit 27 to move in the S4-direction (S4) for a distance the same as that of the first output structure, the first horizontally movable blocks 222 and the second horizontally movable blocks 232 are moved codirectionally (i.e., in the S4-direction) for the same distance. By virtue of the configurations of the first linear guiding components 225, the second linear guiding components 235 and the first auxiliary moving units 24, the first follower block 223 of each of the first main moving units 22 is moved in the S5-direction (S5) relative to the first horizontally movable block 222 of the corresponding one of the first main moving units 22, and the second follower block 233 of each of the second main moving units 23 is moved in the S7-direction (S7) relative to the second horizontally movable block 232 of the corresponding one of the second main moving units 23, so as to rotate the first platform 25 about the first rotating axis (R1, see FIG. 2).

It is noted that, a variation of the first embodiment may include a first platform module 2 that includes only one first main moving unit 22 and only one second main moving unit 23. In this variation, the first connecting plate 262 and the first positioning seat 263 of the first driving unit 26 are omitted, and the first output shaft 264 is connected directly and co-movably to the first horizontally movable block 222 of the first main moving unit 22. Similarly, the second connecting plate 272 and the second positioning seat 273 of the second driving unit 27 are omitted, and the second output shaft 274 is connected directly and co-movably to the second horizontally movable block 232 of the second main moving unit 23.

The operation of the first embodiment can be summarized as follows: when the first output structure of the first driving unit 26 and the second output structure of the second driving unit 27 move in opposite directions for the same distance, the first and second main moving units 22, 23 are driven to move the first platform 25 in the z-direction (Z); when the first output structure of the first driving unit 26 and the second output structure of the second driving unit 27 move codirectionally for the same distance, the first and second main moving units 22, 23 are driven to rotate the first platform 25 about the first rotating axis (R1); and when the first output structure of the first driving unit 26 and the second output structure of the second driving unit 27 move respectively for different distances, the first and second main moving units 22, 23 are driven to move the first platform 25 in the z-direction (Z) and rotate the first platform 25 about the first rotating axis (R1).

To sum up, through the configurations of the first and second main moving units 22, 23 of this disclosure, the first platform 25 can be moved in a direction (i.e., the z-direction) perpendicular to the moving directions of the first output structure of the first driving unit 26 and the second output structure of the second driving unit 27 (i.e., the x-direction and the y-direction), and can be rotated about an axis (i.e., the first rotating axis) that resides in the X-Y plane.

Figure 10:
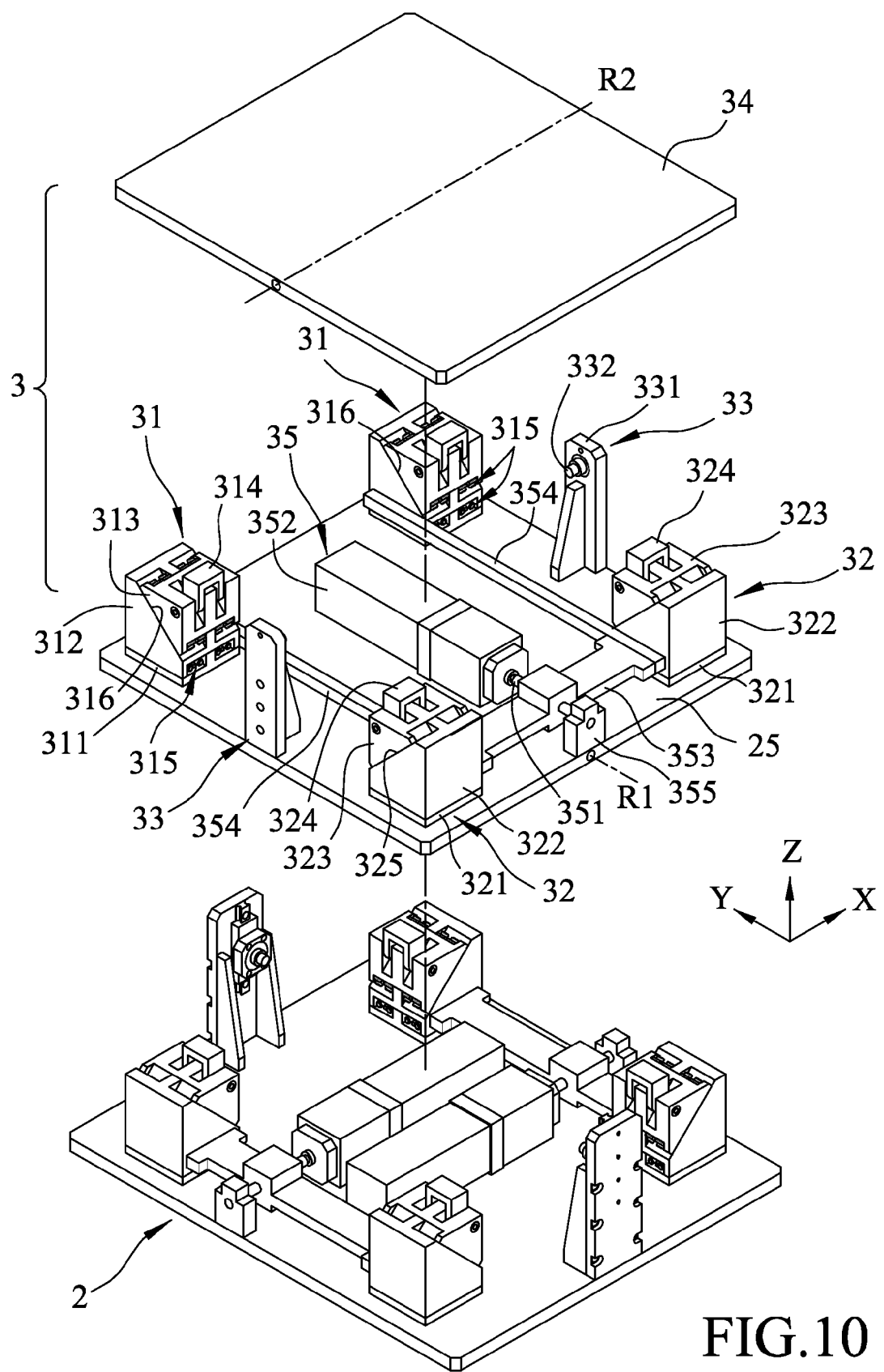
FIG. 10 is a partly exploded perspective view of a second embodiment of the multi-axis carrying device according to the disclosure.
Figure 11:
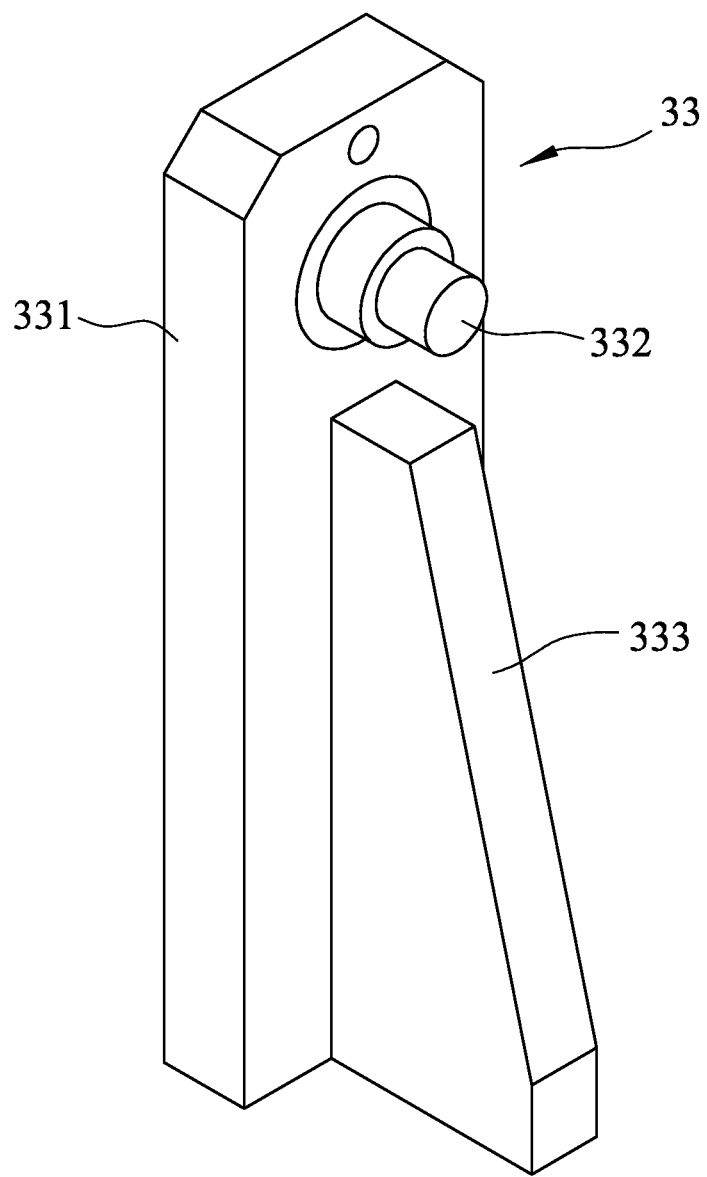
FIG. 11 is a perspective view of a second auxiliary moving unit of the second embodiment.
Figure 12:
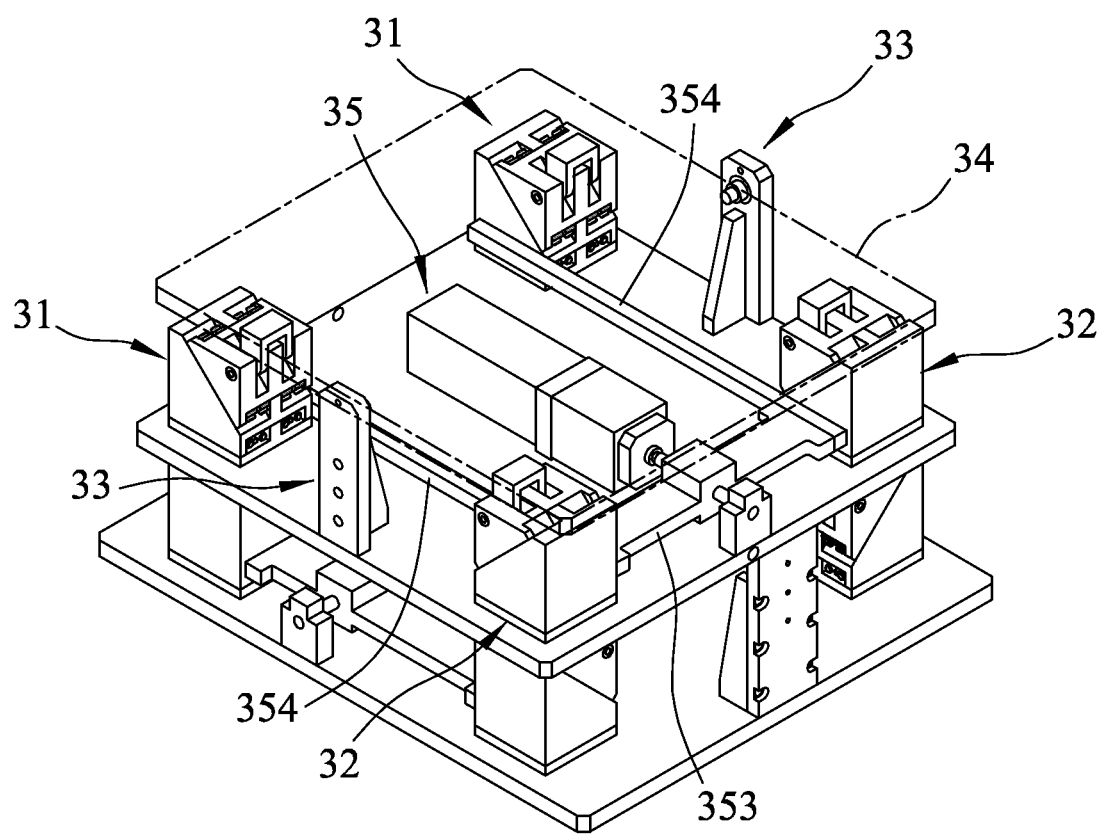
FIG. 12 is a schematic assembled perspective view of the second embodiment.

Referring to FIGS. 10 to 12, a second embodiment of the multi-axis carrying device according to the disclosure includes a first platform module 2 and a second platform module 3. The first platform module 2 of the second embodiment is configured to be the same as that of the first embodiment. The second platform module 3 includes a pair of third main moving units 31, a pair of fourth main moving units 32, a pair of second auxiliary moving units 33, a second platform 34 and a third driving unit 35.

The third main moving units 31 are mounted on the first platform 25, and are spaced apart from each other in the x-direction (X). Each of the third main moving units 31 includes a third bottom plate 311 that is fixed to the first platform 25, a third horizontally movable block 312 that is movable relative to the third bottom plate 311 in the y-direction (Y), that is in the shape of a trapezoid, and that has an inclined third cam surface 316, a third follower block 313 that is movable relative to the third horizontally movable block 312 along the third cam surface 316, and a third pivoting block 314 that is pivoted to the third follower block 313. Each of the third main moving units 31 further includes a plurality of third linear guiding components 315 that are connected between the third t bottom plate 311 and the third horizontally movable block 312 of a corresponding one of the third main moving units 31 for guiding the movement of the third horizontally movable block 312 relative to the third bottom plate 311, and between the third horizontally movable block 312 and the third follower block 313 of the corresponding one of the third main moving units 31 for guiding the movement of the third follower block 313 relative to the third horizontally movable block 312.

The fourth main moving units 32 are mounted on the first platform 25, and are spaced apart from each other in the x-direction (X). Each of the fourth main moving units 32 includes a fourth bottom plate 321 that is fixed to the first platform 25, a fourth horizontally movable block 322 that is movable relative to the fourth bottom plate 321 in the y-direction (Y), that is in the shape of a trapezoid, and that has an inclined fourth cam surface 325, a fourth follower block 323 that is movable relative to the fourth horizontally movable block 322 along the fourth cam surface 325, and a fourth pivoting block 324 that is pivoted to the fourth follower block 323. Each of the fourth main moving units 32 further includes a plurality of fourth linear guiding components (not shown) that are connected between the fourth bottom plate 321 and the fourth horizontally movable block 322 of a corresponding one of the fourth main moving units 32 for guiding the movement of the fourth horizontally movable block 322 relative to the fourth bottom plate 321, and between the fourth horizontally movable block 322 and the fourth follower block 323 of the corresponding one of the fourth main moving units 32 for guiding the movement of the fourth follower block 323 relative to the fourth horizontally movable block 322.

It is noted that the first, second, third and fourth main moving units 22, 23, 31, 32 of this embodiment are configured to be similar to each other, so that the configuration of the fourth linear guiding components of each of the fourth main moving units 32 can be illustrated by FIG. 3.

The second platform 34 is coupled to the third and fourth main moving units 31, 32. In this embodiment, the third pivoting block 314 of each of the third main moving units 31 and the fourth pivoting block 324 of each of the fourth main moving units 32 are connected fixedly to a bottom surface of the second platform 34.

The second auxiliary moving units 33 are mounted on the first platform 25, and are spaced apart from each other in the x-direction (X). The third main moving units 31 are located at one side of the second auxiliary moving units 33 opposite to the fourth main moving units 32. Each of the second auxiliary moving units 33 includes a second upright stand 331 that is fixed to the first platform 25, a second rotating shaft 332 that is mounted rotatably to the second upright stand 331, and a reinforcing plate 333 that is connected between the second upright stand 331 and the first platform 25 for supporting the second upright stand 331. The second rotating shafts 332 of the second auxiliary moving units 33 are respectively coupled to two opposite sides of the second platform 34 along a second rotating axis (R2) that extends in the x-direction (X), so that the second platform 34 is rotatable about the second rotating axis (R2).

The third driving unit 35 includes a third output shaft 351, a third driving source 352, a third connecting plate 353, a pair of connecting rods 354 and a third positioning seat 355. The third positioning seat 355 is mounted fixedly on the first platform 25. Each of the connecting rods 354 interconnects co-movably the third horizontally movable block 312 of a respective one of the third main moving units 31 and the fourth horizontally movable block 322 of a respective one of the fourth main moving units 32. The third connecting plate 353 is connected co-movably to the connecting rods 354, and is located between the fourth horizontally movable blocks 322 of the fourth main moving units 32. The third output shaft 351 is movable relative to the first platform 25 in the y-direction (Y), is connected co-movably to a middle portion of the third connecting plate 353, and extends movably into the third positioning seat 355. The third driving source 352 is mounted on the first platform 25 for driving movements of the third output shaft 351, the third connecting plate 353, the connecting rods 354 and the third and fourth horizontally movable blocks 312, 322 in they-direction (Y). The third output shaft 351, the third connecting plate 353 and the connecting rods 354 cooperatively serve as a third output structure of the third driving unit 35. Each of the third and fourth follower blocks 313, 323 moves along a corresponding one of the third and fourth cam surfaces 316, 325 for rotating the second platform 34 about the second rotating axis (R2) upon the movement of the third output structure of the third driving unit 35 relative to the first platform 25.

It is noted that the third connecting plate 353 may be connected co-movably to only one of the connecting rods 354 for driving linear and rotational movements of the second platform 34. With the abovementioned configuration, the other one of the connecting rods 354 and the third and fourth horizontally movable blocks 312, 322 that are connected co-movably to the other one of the connecting rods 354 are driven movably in response to the movement of the second platform 34.

Figure 13:
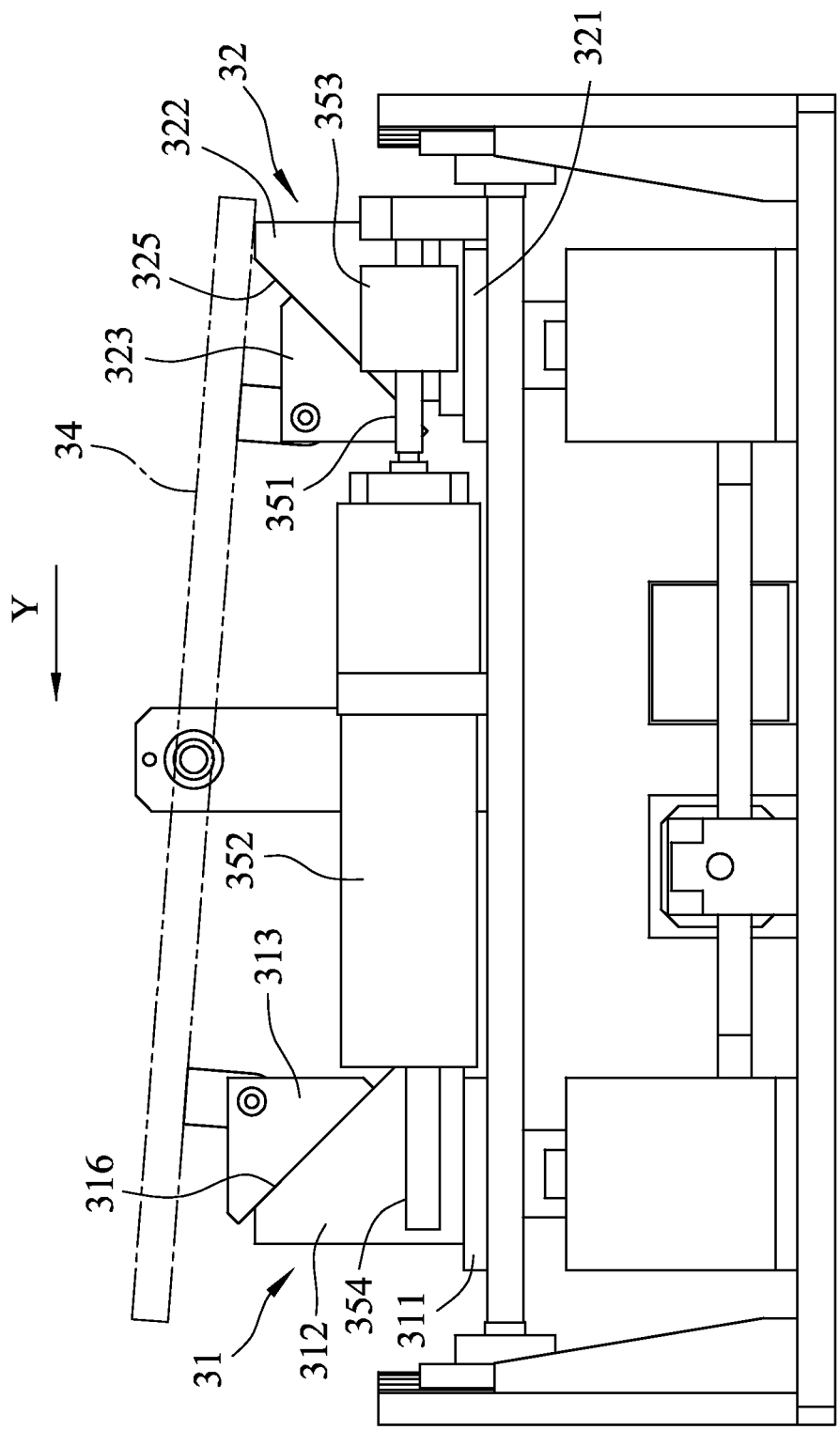
FIG. 13 is a schematic side view of the second embodiment, illustrating a second platform being rotated about a second rotating axis.

Referring further to FIG. 13, when the third driving source 352 drives the third output structure of the third driving unit 35 to move in the y-direction (Y), the third horizontally movable blocks 312 and the fourth horizontally movable blocks 2322 are moved codirectionally (i.e., in the y-direction) for the same distance. Since the third linear guiding components 315 limit the relative linear movement between the third follower block 313 and the third horizontally movable block 312 of each of the third main moving units 31, since the fourth linear guiding components limit the relative linear movement between the fourth follower block 323 and the fourth horizontally movable block 322 of each of the fourth main moving units 32, and since the second auxiliary moving units 33 limit the linear and rotational movements of the second platform 34 relative to the first platform 25, the third follower block 313 of each of the third main moving units 31 is moved relative to the third horizontally movable block 312 of the corresponding one of the third main moving units 31, and the fourth follower block 323 of each of the fourth main moving units 32 is moved relative to the fourth horizontally movable block 322 of the corresponding one of the fourth main moving units 32, so as to rotate the second platform 34 about the second rotating axis (R2, see FIG. 10).

Since the second embodiment of this disclosure combines the first and second platform modules 2, 3, the second platform 34 can be operated to move in the z-direction (Z) and rotate about the first and second rotating axes (R1, R2). Each of the first and second platform modules 2, 3 can be used solely or be combined with additional first and second platform modules 2, 3 to provide additional degrees of freedom for different demands. Moreover, since the first and second platform modules 2, 3 of the second embodiment respectively carry out independent and particular motions of the carrying device, the whole action of the carrying device can be controlled easily and precisely.

Figure 14:
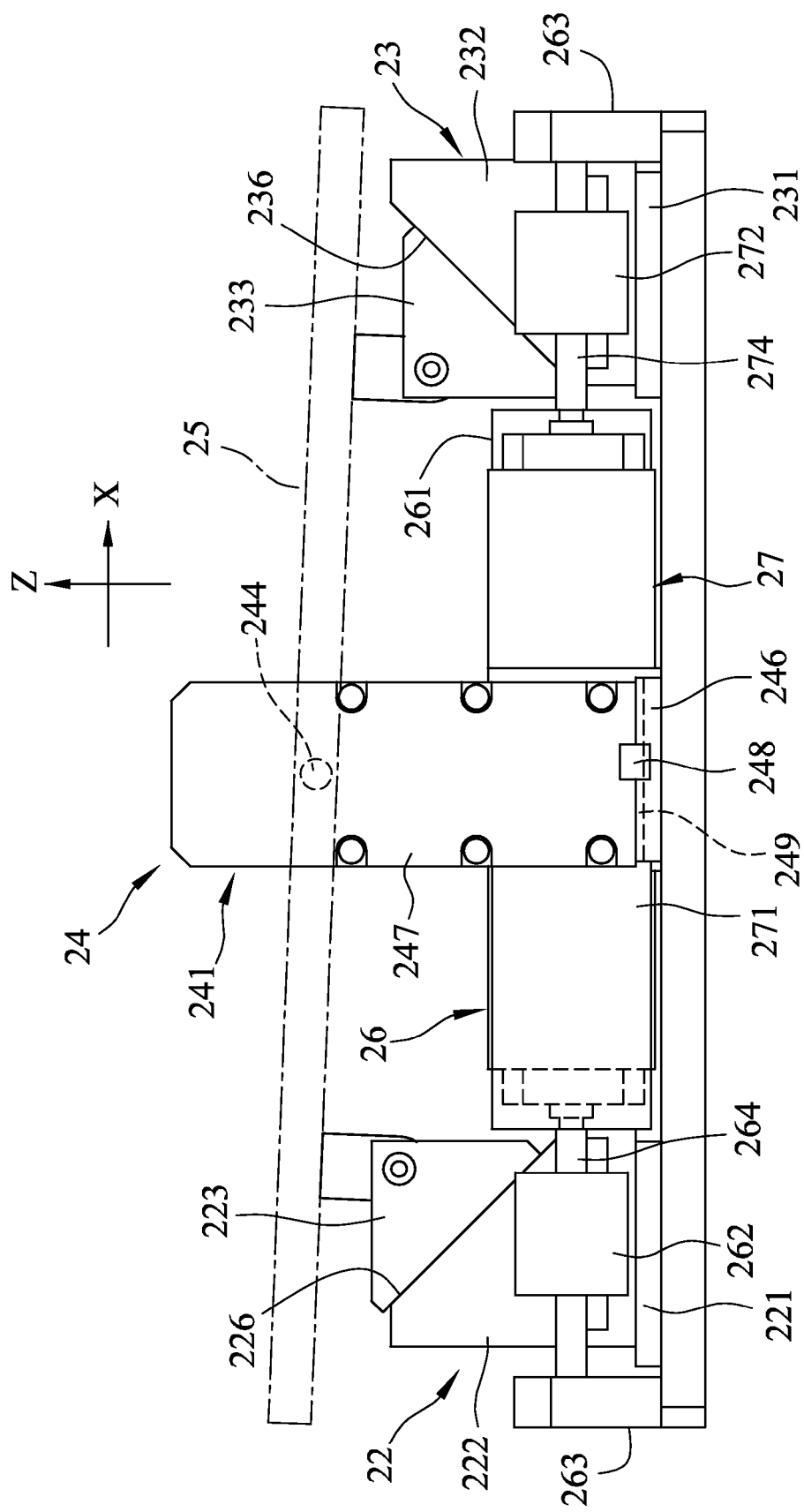
FIG. 14 is a schematic side view of a third embodiment of the multi-axis carrying device according to the disclosure.

Referring to FIG. 14, a third embodiment of the multi-axis carrying device according to the disclosure is similar to the first embodiment. In the third embodiment, the first upright stand 241 of each of the first auxiliary moving units 24 includes a first seat 246 that is fixed to the base 21, and a first slider 247 that is movable relative to the first seat 246 in the x-direction (X) and that is provided with the first guide rail 242 of a corresponding one of the first auxiliary moving units 24. Each of the first auxiliary moving units 24 further includes a fifth linear guiding unit 249 that is connected between the first seat 246 and the first slider 247 of the corresponding one of the first auxiliary moving units 24 for guiding the movement of the first slider 247 relative to the first seat 246, and a first braking device 248 that is operable to permit or prevent the movement of the first slider 247 relative to the first seat 246. With the abovementioned configuration, when the first braking device 248 of each of the first auxiliary moving units 24 prevents the relative movement between the first slider 247 and the first seat 246 of the corresponding one of the first auxiliary moving units 24, the first platform 25 is rotated about the first rotating axis (R1, referring to FIG. 2) upon the codirectional and equidistant movements of the first and second horizontally movable blocks 222, 232. When the first braking device 248 of each of the first auxiliary moving units 24 permits the relative movement between the first slider 247 and the first seat 246 of the corresponding one of the first auxiliary moving units 24, the first platform 25 is moved in the x-direction (X) upon the codirectional and equidistant movements of the first and second horizontally movable blocks 222, 232.

It is noted that the fifth linear guiding unit 249 of each of the first auxiliary moving units 24 may include a guide rod and sleeve that are movable relative to each other and that are respectively connected to the first slider 247 and the first seat 246 of the corresponding one of the first auxiliary moving units 24, or may include a groove and an engaging block that engage slidably each other and that are respectively provided on the first slider 247 and the first seat 246 of the corresponding one of the first auxiliary moving units 24.

Figure 15:
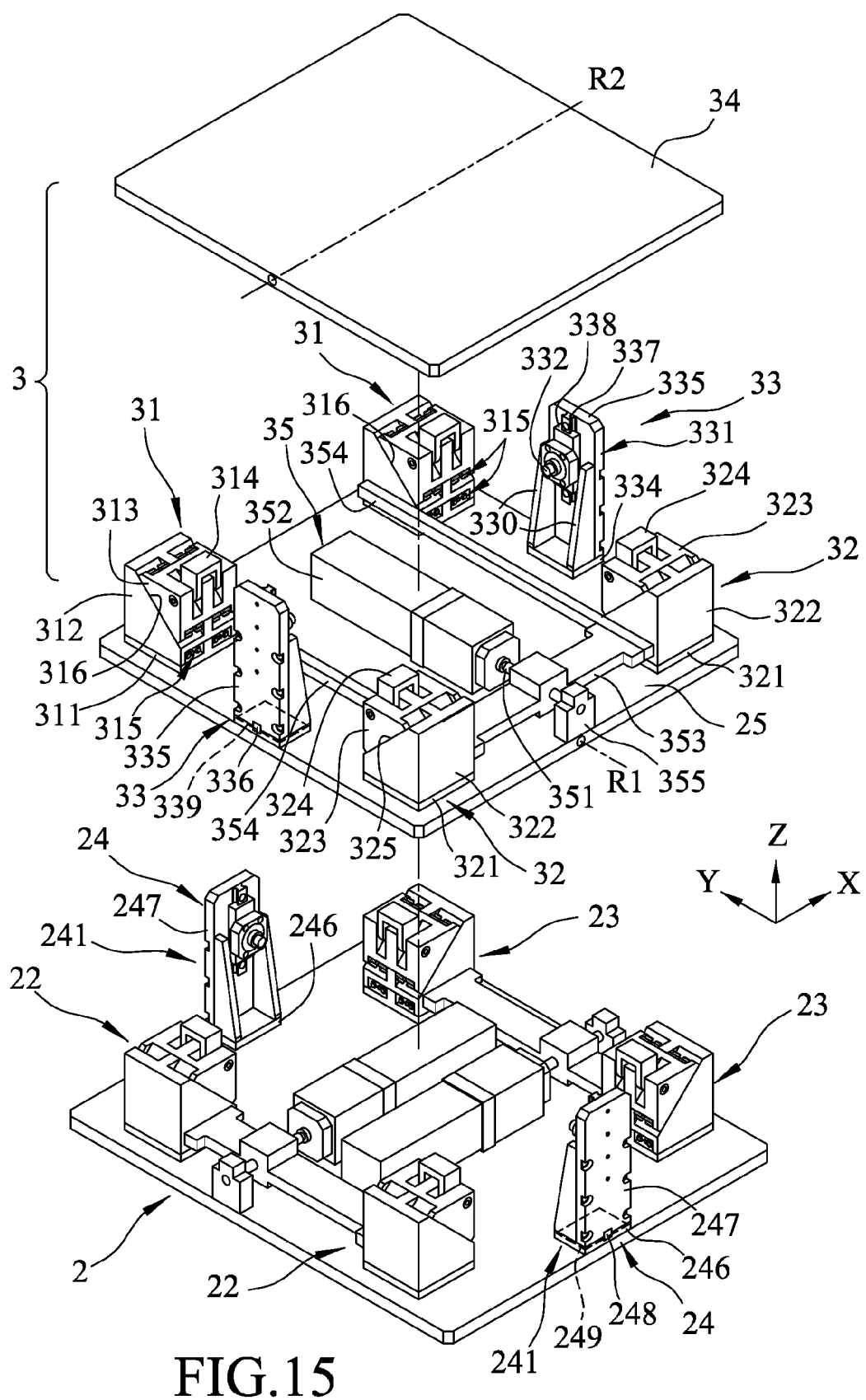
FIG. 15 is a partly exploded perspective view of a fourth embodiment of the multi-axis carrying device according to the disclosure.

Referring to FIG. 15, a fourth embodiment of the multi-axis carrying device according to the disclosure is similar to the second embodiment. In the fourth embodiment, the first upright stand 241 of each of the first auxiliary moving units 24 is configured to be similar to that of the third embodiment. Moreover, each of the second auxiliary moving units 33 includes a second upright stand 331 that is fixed to the first platform 25, a second guide rail 337 that is disposed on the second upright stand 331 and that extends in the z-direction (Z), a second sliding block 338 that engages the second guide rail 337 and that is movable along the second guide rail 337, a second rotating shaft 332 that is mounted rotatably to the second sliding block 338, and a pair of reinforcing plates 330 that are respectively and perpendicularly connected to two opposite sides of the second upright stand 331 for supporting the second upright stand 331. The second rotating shafts 332 of the second auxiliary moving units 33 are respectively coupled to two opposite sides of the second platform 34 along the second rotating axis (R2), so that the second platform 34 is rotatable about the second rotating axis (R2) and movable relative to the first platform 25 in the z-direction (Z). The second upright stand 331 of each of the second auxiliary moving units 33 includes a second seat 334 that is fixed to the first platform 25, and a second slider 335 that is movable relative to the second seat 334 in the y-direction (Y) and that is provided with the second rotating shaft 332 of the corresponding one of the second auxiliary moving units 33. Each of the second auxiliary moving units 33 further includes a sixth linear guiding unit 330 that is connected between the second seat 334 and the second slider 335 of the corresponding one of the second auxiliary moving units 33 for guiding the movement of the second slider 335 relative to the second seat 334, and a second braking device 336 that is operable to permit or prevent the movement of the second slider 335 relative to the second seat 334. With the abovementioned configuration, when the second braking device 336 of each of the second auxiliary moving units 33 prevents the relative movement between the second slider 335 and the second seat 334 of the corresponding one of the second auxiliary moving units 33, the second platform 34 is rotated about the second rotating axis (R2) upon the codirectional and equidistant movements of the third and fourth horizontally movable blocks 312, 322. Moreover, when the second braking device 336 of each of the second auxiliary moving units 33 permits the relative movement between the second slider 335 and the second seat 334 of the corresponding one of the second auxiliary moving units 33, the second platform 34 is moved in the y-direction (Y) upon the codirectional and equidistant movements of the third and fourth horizontally movable blocks 312, 322.

It is noted that the sixth linear guiding unit 330 of each of the second auxiliary moving units 33 may include a guide rod and sleeve that are movable relative to each other and that are respectively connected to the second slider 335 and the second seat 334 of the corresponding one of the second auxiliary moving units 33, or may include a groove and an engaging block that engage slidably each other and that are respectively provided on the second slider 335 and the second seat 334 of the corresponding one of the second auxiliary moving units 33.

By virtue of the configurations of the first and second auxiliary moving units 24, 33 of the fourth embodiment of this disclosure, the second platform 34 can be operated to move in the x-direction (X), the y-direction (Y), and can still be operated to move in the z-direction (Z), and to rotate about the first and second rotating axes (R1, R2).

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A multi-axis carrying device comprising:
    a first platform module including
        a base,
        at least one first main moving unit that is mounted on said base,
        at least one second main moving unit that is mounted on said base and that is spaced apart from said first main moving unit,
        a first platform that is coupled to said first and second main moving units,
        a pair of first auxiliary moving units that are mounted on said base and that are respectively coupled to two opposite sides of said first platform along a first rotating axis that extends in a y-direction such that said first platform is rotatable about the first rotating axis,
        a first driving unit that is mounted on said base and that has a first output structure movable in an x-direction that is perpendicular to the y-direction and coupled to said first main moving unit for driving movement of a portion of said first main moving unit on said base, and
        a second driving unit that is mounted on said base and that has a second output structure movable in the x-direction and coupled to said second main moving unit for driving movement of a portion of said second main moving unit on said base;
    wherein, when said first output structure of said first driving unit and said second output structure of said second driving unit move respectively in opposite directions for the same distance, said first and second main moving units are driven to move said first platform in a z-direction that is perpendicular to the x-direction and the y-direction;
    wherein, when said first output structure of said first driving unit and said second output structure of said second driving unit move codirectionally for the same distance, said first and second main moving units are driven to rotate said first platform about the first rotating axis; and
    wherein, when said first output structure of said first driving unit and said second output structure of said second driving unit move respectively for different distances, said first and second main moving units are driven to move said first platform in the z-direction and rotate said first platform about the first rotating axis.

2. The multi-axis carrying device as claimed in claim 1, wherein:
    said first platform module includes two said first main moving units that are spaced apart from each other in the y-direction, and two said second main moving units that are spaced apart from each other in the y-direction and that are located at one side of said first auxiliary moving units opposite to said first main moving units;
    each of said first main moving units includes a first bottom plate that is fixed to said base, a first horizontally movable block that is movable relative to said first bottom plate in the x-direction, that is connected co-movably to said first output structure of said first driving unit, and that has an inclined first cam surface, a first follower block that is movable relative to said first horizontally movable block along said first cam surface, and a first pivoting block that is pivoted to said first follower block, that is connected fixedly to a bottom surface of said first platform, and that cooperates with said first horizontally movable block and said first follower block to constitute said portion of a corresponding one of said first moving units; and
    each of said second main moving units includes a second bottom plate that is fixed to said base, a second horizontally movable block that is movable relative to said second bottom plate in the x-direction, that is connected co-movably to said second output structure of said second driving unit, and that has an inclined second cam surface, a second follower block that is movable relative to said second horizontally movable block along said second cam surface, and a second pivoting block that is pivoted to said second follower block, that is connected fixedly to said bottom surface of said first platform, and that cooperates with said second horizontally movable block and said second follower block to constitute said portion of a corresponding one of said second moving units each of said first and second follower blocks moving along a corresponding one of said first and second cam surfaces for driving the movement of said first platform relative to said base upon the movement of said first output structure of said first driving unit and the movement of said second output structure of said second driving unit.

3. The multi-axis carrying device as claimed in claim 2, wherein:
    said first driving unit includes a first positioning seat that is mounted fixedly on said base, a first connecting plate that is connected co-movably to at least one of said first horizontally movable blocks of said first main moving units, a first output shaft that is movable relative to said base in the x-direction, that is connected co-movably to a middle portion of said first connecting plate, and that extends movably into said first positioning seat, and a first driving source for driving movements of said first output shaft, said first connecting plate and the at least one of said first horizontally movable blocks in the x-direction, said first output shaft and said first connecting plate cooperatively serving as said first output structure of said first driving unit; and
    said second driving unit includes a second positioning seat that is mounted fixedly on said base, a second connecting plate that is connected co-movably to at least one of said second horizontally movable blocks of said second main moving units, a second output shaft that is movable relative to said base in the x-direction, that is connected co-movably to a middle portion of said second connecting plate, and that extends movably into said second positioning seat, and a second driving source for driving movements of said second output shaft, said second connecting plate and the at least one of said second horizontally movable blocks in the x-direction, said second output shaft and said second connecting plate cooperatively serving as said second output structure of said second driving unit.

4. The multi-axis carrying device as claimed in claim 3, wherein:
each of said first main moving units further includes a plurality of first linear guiding components that are connected between said first bottom plate and said first horizontally movable block of a corresponding one of said first main moving units for guiding the movement of said first horizontally movable block relative to said first bottom plate, and between said first horizontally movable block and said first follower block of the corresponding one of said first main moving units for guiding the movement of said first follower block relative to said first horizontally movable block; and
each of said second main moving units further includes a plurality of second linear guiding components that are connected between said second bottom plate and said second horizontally movable block of a corresponding one of said second main moving units for guiding the movement of said second horizontally movable block relative to said second bottom plate, and between said second horizontally movable block and said second follower block of the corresponding one of said second main moving units for guiding the movement of said second follower block relative to said second horizontally movable block.

5. The multi-axis carrying device as claimed in claim 4, wherein each of said first auxiliary moving units includes a first upright stand that is fixed to said base, a first guide rail that is disposed on said first upright stand and that extends in the z-direction, a first sliding block that engages said first guide rail and that is movable along said first guide rail, and a first rotating shaft that is mounted rotatably to said first sliding block, said first rotating shafts of said first auxiliary moving units being respectively coupled to said two opposite sides of said first platform along the first rotating axis so as to guide the linear and rotational movements of said first platform.

6. The multi-axis carrying device as claimed in claim 1, further comprising a second platform module including
a pair of third main moving units that are mounted on said first platform and that are spaced apart from each other in the x-direction,
a pair of fourth main moving units that are mounted on said first platform and that are spaced apart from each other in the x-direction,
a second platform that is coupled to said third and fourth main moving units,
a pair of second auxiliary moving units that are mounted on said first platform and that are respectively coupled to two opposite sides of said second platform along a second rotating axis that extends in the x-direction such that said second platform is rotatable about the second rotating axis, and
a third driving unit that is mounted on said first platform and that has a third output structure movable in the y-direction and coupled to said third and fourth main moving units for activating said third and fourth main moving units, said third main moving units being located at one side of said second auxiliary moving units opposite to said fourth main moving units, said third and fourth main moving units being driven to rotate said second platform about the second rotating axis when said third output structure of said third driving unit moves.

7. The multi-axis carrying device as claimed in claim 6, wherein:
each of said third main moving units includes a third bottom plate that is fixed to said first platform, a third horizontally movable block that is movable relative to said third bottom plate in the y-direction, that is driven movably by said third output structure of said third driving unit, and that has an inclined third cam surface, a third follower block that is movable relative to said third horizontally movable block along said third cam surface, and a third pivoting block that is pivoted to said third follower block and that is connected fixedly to a bottom surface of said second platform; and
each of said fourth main moving units includes a fourth bottom plate that is fixed to said first platform, a fourth horizontally movable block that is movable relative to said fourth bottom plate in the y-direction, that is driven movably by said third output structure of said third driving unit, and that has an inclined fourth cam surface, a fourth follower block that is movable relative to said fourth horizontally movable block along said fourth cam surface, and a fourth pivoting block that is pivoted to said fourth follower block and that is connected fixedly to said bottom surface of said second platform, each of said third and fourth follower blocks moving along a corresponding one of said third and fourth cam surfaces for rotating said second platform about the second rotating axis upon the movement of said third output structure of said third driving unit relative to said first platform.

8. The multi-axis carrying device as claimed in claim 7, wherein said third driving unit includes a third positioning seat that is mounted fixedly on said first platform, a pair of connecting rods each of which interconnects co-movably said third horizontally movable block of a respective one of said third main moving units and said fourth horizontally movable block of a respective one of said fourth main moving units, a third connecting plate that is connected co-movably to at least one of said connecting rods, a third output shaft that is movable relative to said first platform in the y-direction, that is connected co-movably to a middle portion of said third connecting plate, and that extends movably into said third positioning seat, and a third driving source for driving movements of said third output shaft, said third connecting plate, the at least one of said connecting rods, and the ones of said third and fourth horizontally movable blocks that are connected co-movably to the at least one of said connecting rods in the y-direction, said third output shaft, said third connecting plate and said connecting rods cooperatively serving as said third output structure of said third driving unit.

9. The multi-axis carrying device as claimed in claim 8, wherein:
each of said third main moving units further includes a plurality of third linear guiding components that are connected between said third bottom plate and said third horizontally movable block of a corresponding one of said third main moving units for guiding the movement of said third horizontally movable block relative to said third bottom plate, and between said third horizontally movable block and said third follower block of the corresponding one of said third main moving units for guiding the movement of said third follower block relative to said third horizontally movable block; and each of said fourth main moving units further includes a plurality of fourth linear guiding components that are connected between said fourth bottom plate and said fourth horizontally movable block of a corresponding one of said fourth main moving units for guiding the movement of said fourth horizontally movable block relative to said fourth bottom plate, and between said fourth horizontally movable block and said fourth follower block of the corresponding one of said fourth main moving units for guiding the movement of said fourth follower block relative to said fourth horizontally movable block.

10. The multi-axis carrying device as claimed in claim 9, wherein each of said second auxiliary moving units includes a second upright stand that is fixed to said first platform, and a second rotating shaft that is mounted rotatably to said second upright stand, said second rotating shafts of said second auxiliary moving units being respectively coupled to said two opposite sides of said second platform along the second rotating axis so as to guide the rotational movement of said second platform.

11. The multi-axis carrying device as claimed in claim 10, wherein said first upright stand of each of said first auxiliary moving units includes a first seat that is fixed to said base, and a first slider that is movable relative to said first seat in the x-direction and that is provided with said first guide rail of a corresponding one of said first auxiliary moving units, each of said first auxiliary moving units further including a fifth linear guiding unit that is connected between said first seat and said first slider for guiding the movement of said first slider relative to said first seat, and a first braking device that is operable to permit or prevent the movement of said first slider relative to said first seat, said first platform being rotated about the first rotating axis upon the codirectional and equidistant movements of said first and second horizontally movable blocks when said first braking device of each of said first auxiliary moving units prevents the relative movement between said first slider and said first seat of the corresponding one of said first auxiliary moving units, said first platform being moved in the x-direction upon the codirectional and equidistant movements of said first and second horizontally movable blocks when said first braking device of each of said first auxiliary moving units permits the relative movement between said first slider and said first seat of the corresponding one of said first auxiliary moving units.

12. The multi-axis carrying device as claimed in claim 11, wherein said second upright stand of each of said second auxiliary moving units includes a second seat that is fixed to said first platform, and a second slider that is movable relative to said second seat in the y-direction and that is provided with said second rotating shaft of a corresponding one of said second auxiliary moving units, each of said second auxiliary moving units further including a sixth linear guiding unit that is connected between said second seat and said second slider for guiding the movement of said second slider relative to said second seat, and a second braking device that is operable to permit or prevent the movement of said second slider relative to said second seat, said second platform being rotated about the second rotating axis upon the codirectional and equidistant movements of said third and fourth horizontally movable blocks when said second braking device of each of said second auxiliary moving units prevents the relative movement between said second slider and said second seat of the corresponding one of said second auxiliary moving units, said second platform being moved in the y-direction upon the codirectional and equidistant movements of said third and fourth horizontally movable blocks when said second braking device of each of said second auxiliary moving units permits the relative movement between said second slider and said second seat of the corresponding one of said second auxiliary moving units.

* * * * *